(12) United States Patent
Kirkconnell

(10) Patent No.: US 9,855,804 B1
(45) Date of Patent: Jan. 2, 2018

(54) TRAILER HITCH SAFETY ASSEMBLY

(71) Applicant: Don W. Kirkconnell, Schoolcraft, MI (US)

(72) Inventor: Don W. Kirkconnell, Schoolcraft, MI (US)

( * ) Notice: Subject to any disclaimer, the term of this patent is extended or adjusted under 35 U.S.C. 154(b) by 0 days.

(21) Appl. No.: 15/439,436

(22) Filed: Feb. 22, 2017

(51) Int. Cl.
| | | |
|---|---|---|
| *B60D 1/28* | (2006.01) | |
| *B60D 1/60* | (2006.01) | |
| *B60D 1/06* | (2006.01) | |
| *B60D 1/18* | (2006.01) | |

(52) U.S. Cl.
CPC ............... *B60D 1/28* (2013.01); *B60D 1/06* (2013.01); *B60D 1/187* (2013.01)

(58) Field of Classification Search
CPC . B60D 1/02; B60D 1/025; B60D 1/06; B60D 1/28; B60D 1/60; B60D 1/605; B60D 1/583; B60D 1/187
USPC ............... 280/507; 70/14, 18, 39, 38 A, 258
See application file for complete search history.

(56) References Cited

U.S. PATENT DOCUMENTS

| | | | | |
|---|---|---|---|---|
| 2,998,982 A * | 9/1961 | Brazil | ...................... | B60D 1/28 |
| | | | | 280/457 |
| 6,666,051 B1 * | 12/2003 | Li | .......................... | B60D 1/60 |
| | | | | 280/507 |
| 6,802,523 B1 * | 10/2004 | Profitt | .................... | B60D 1/025 |
| | | | | 280/432 |
| 7,121,121 B2 * | 10/2006 | Wyers | .................... | B60D 1/065 |
| | | | | 280/507 |
| 7,976,054 B1 * | 7/2011 | Phipps | ..................... | B60D 1/06 |
| | | | | 280/415.1 |
| 2003/0057678 A1 * | 3/2003 | Barton | .................... | B60D 1/065 |
| | | | | 280/507 |
| 2003/0205884 A1 * | 11/2003 | Koy | .......................... | B60D 1/60 |
| | | | | 280/507 |
| 2005/0039498 A1 * | 2/2005 | Budge | ...................... | B60D 1/02 |
| | | | | 70/14 |
| 2007/0102898 A1 * | 5/2007 | Schulze | ................... | B60D 1/02 |
| | | | | 280/507 |
| 2010/0230932 A1 * | 9/2010 | Pratt | ....................... | B60D 1/06 |
| | | | | 280/507 |
| 2014/0265245 A1 * | 9/2014 | McCoy | ................. | B60D 1/187 |
| | | | | 280/457 |
| 2015/0097356 A1 * | 4/2015 | Breeden, III | ............ | B60D 1/06 |
| | | | | 280/507 |
| 2015/0123379 A1 * | 5/2015 | Yuan | ....................... | B60D 1/06 |
| | | | | 280/507 |

FOREIGN PATENT DOCUMENTS

| | | | | |
|---|---|---|---|---|
| WO | 2016/042497 | * | 3/2016 | ............... B60D 1/60 |

* cited by examiner

*Primary Examiner* — Anne Marie Boehler
(74) *Attorney, Agent, or Firm* — Warner Norcross and Judd LLP

(57) ABSTRACT

A trailer hitch safety assembly and a method of use for inhibiting uncoupling of a trailer coupler from a towing hitch. The trailer hitch safety assembly includes a mounting ring that is received on the shank portion of a towing hitch. The trailer hitch safety assembly also includes a base having first and second base portions that are releasably connected together around the mounting ring to retain the base on the shank portion. A locking arm releasably connects to the base and extends over the coupled trailer coupler and towing hitch to inhibit uncoupling of the trailer coupler from the towing hitch.

16 Claims, 7 Drawing Sheets

TRAILER HITCH SAFETY ASSEMBLY

BACKGROUND

The present invention relates to trailer hitch safety assemblies for inhibiting uncoupling of a trailer coupler from a towing hitch.

Hauling of a trailer by a vehicle typically includes connecting the trailer to the vehicle by coupling the trailer to a towing hitch mounted to the vehicle. A typical configuration includes fitting a coupler mounted on the trailer over a hitch ball mounted to the vehicle. One concern during hauling and storage of the trailer is that the trailer will become unhitched and separate from the vehicle. A conventional coupler includes a locking latch mechanism with a separate latch pin that secures the coupler onto the hitch ball. However, the latch mechanism does not ensure that the trailer will not come unhitched from the vehicle.

Multiple factors can contribute to a conventional trailer coupler and towing hitch separating and thus failing to keep the trailer attached to the towing vehicle. User error in failing to properly couple the trailer often plays a role in unintended separating of the trailer coupler and towing hitch. Trailer couplers and hitch balls typically come in three standard sizes, which requires the coupler on the trailer to be paired with the correct size hitch ball on the towing vehicle. Users may knowingly or unknowingly incorrectly pair mismatched trailer couplers and hitch balls and/or not properly engage the coupler, which can result in an unreliable connection with the coupler latch mechanism due to improper fit of the trailer coupler and hitch ball. Whether properly or improperly paired, the trailer coupler may not fully or properly engage over the hitch ball prior to engaging the latch mechanism, which may result in failure of the latch mechanism.

Many latch mechanisms include a latch pin that is inserted through the latch mechanism to help prevent the latch mechanism from unintentionally disengaging, However, many users fail to use the latch pin, either intentionally or unintentionally. In addition, over time the trailer coupler and its components may wear or loosen from repeated use which may result in a loose or improper fit of the trailer coupler on the hitch ball. Loose or improper mounting of the hitch ball on the towing vehicle, such as the fit of the hitch ball in its mounting hole on the towing vehicle or an unsecure nut mounting the hitch ball on the towing vehicle can also contribute to unintended uncoupling of the trailer.

These factors can contribute to the risk of unintended disconnection of the trailer from the vehicle and thus an additional safety device is often used, and sometimes required by government regulations, to inhibit separation of the trailer from the towing vehicle. Typically, a minimum of two chains are used to connect the trailer to the towing vehicle to prevent the trailer from separating from the towing vehicle completely in the event that the trailer becomes unhitched. However, the safety chains only become useful after the trailer has uncoupled and are only of use if they've been properly selected and installed.

Properly installed safety chains may help to decrease the risk of harm to surrounding drivers, however, once the trailer comes uncoupled, the trailer may become uncontrollable yet is still attached to the towing vehicle. This scenario can result in an increased risk of harm to the towing vehicle and its driver, especially at high speeds. In addition, depending on the type of trailer being towed and its contents, an uncoupled trailer attached to the towing vehicle via chains can cause the trailer's contents to shift. This can result in the contents of the trailer becoming dislodged and potentially falling off the trailer, especially in the case of an open trailer, which can present a safety hazard to surrounding drivers.

Properly installed safety chains require the correct gauge of chain and hooks to be selected based on the weight of the trailer and the load being towed. The correct number of chains must also be determined to ensure that the safety chains are strong enough to remain intact should the trailer come unhitched. The wrong gauge or length of chains or hooks or improperly installed chains may cause the chains and/or hooks to fail, break or unhook, resulting in separation of the trailer from the vehicle in the event the trailer comes unhitched. Furthermore, the safety chains are bulky and can be cumbersome to install and store. In addition, the safety chains may drag on the ground during use and possibly become disconnected or entangled with other components of the trailer or towing vehicle. In some instances, improperly installed safety chains have caused fires. The safety chains are also limited in their ability to prevent theft of the trailer.

SUMMARY

The aforementioned issues are addressed by the present invention in which a trailer hitch safety assembly includes a locking arm that extends over a trailer coupler and inhibits the trailer coupler from uncoupling from a towing hitch, thereby reducing the risk that a trailer is unintentionally uncoupled from a towing hitch. For example, the trailer hitch safety assembly can inhibit the trailer coupler from uncoupling in the event that the existing trailer coupler fails due to improper assembly, improper fit of the trailer coupler and hitch ball, and/or failure of the coupler assembly latch mechanism.

According to an embodiment of the invention, a trailer hitch safety assembly for inhibiting uncoupling of a trailer coupler from a towing hitch is provided. The towing hitch includes a hitch ball having a ball portion and a shank portion. The trailer coupler includes a ball socket configured to receive the ball portion when the trailer coupler is coupled to the towing hitch. The trailer hitch safety assembly includes a mounting ring defining a bore adapted to receive the shank portion and a base having a first and a second base portion. At least one of the first and second base portions defines a ring receiver adapted to receive the mounting ring. The first and second base portions releasably connect together around the mounting ring to retain the mounting ring within the receiver. The trailer hitch safety assembly also includes a locking arm having a first end portion and a second end portion connected by a central portion, with the first and second end portions releasably connecting to the base. The central portion of the locking arm extends over the coupled trailer coupler and towing hitch when the first and second end portions are connected to the base to inhibit uncoupling of the trailer coupler from the towing hitch.

In another embodiment, a method for inhibiting uncoupling of a trailer coupler from a towing hitch is provided. The towing hitch includes a hitch ball having a ball portion and a shank portion, with the trailer coupler including a ball socket that receives the ball portion when the trailer coupler is coupled to the towing hitch. The method includes installing a mounting ring on the shank portion. The mounting ring includes a bore that is adapted to receive the shank portion. The method also includes installing a first base portion around the mounting ring, with the first base portion defining at least a portion of a ring receiver adapted to receive the mounting ring. A locking arm is installed over the coupled trailer coupler and towing hitch. The locking arm includes a central portion extending over the trailer coupler and first and second end portions adapted to releasably connect to the first base portion. The first and second end portions are inserted into a first pair of channels formed in the first base portion, and a second base portion is connected to the first base portion around the mounting ring. The first and second base portions together form a base encompassing the mounting ring. The first and second end portions are secured within the first base portion. The locking arm extends over the trailer coupler and inhibits the trailer coupler from uncoupling from the towing hitch when the first and second end portions are connected to the base.

In some embodiments, the trailer hitch safety assembly is also configured to prevent unauthorized uncoupling of the trailer.

The embodiments of the invention provide a number of advantages. Firstly, the trailer hitch safety assembly is easy to install and remove, thereby reducing the likelihood of failure due to user error during installation and removal. Secondly, the trailer hitch safety assembly is compact, making it easy to store when not in use and minimizing its footprint during use. Third, the compact trailer hitch safety assembly does not have hanging/trailing parts that may become entangled with other parts of the towing vehicle, trailer, and/or the surroundings. Fourth, the trailer hitch safety assembly, when properly installed, prevents the coupler assembly from accidentally separating from the towing hitch. The trailer hitch safety assembly is configured to inhibit uncoupling of the coupler assembly even if the connection between the coupler and the towing hitch is loose or if the coupler and towing hitch are not properly paired. Finally, in some embodiments, the trailer hitch safety assembly also inhibits theft of the trailer by preventing unauthorized uncoupling of the trailer coupler from the towing hitch. The trailer safety hitch assembly described herein can be used in addition to or as an alternative to conventional safety chains, thus avoiding many of the challenges associated with safety chains described above.

These and other advantages and features of the invention will be more fully understood and appreciated by reference to the description of the current embodiment and the drawings.

DESCRIPTION

I. Structure

Figure 1:
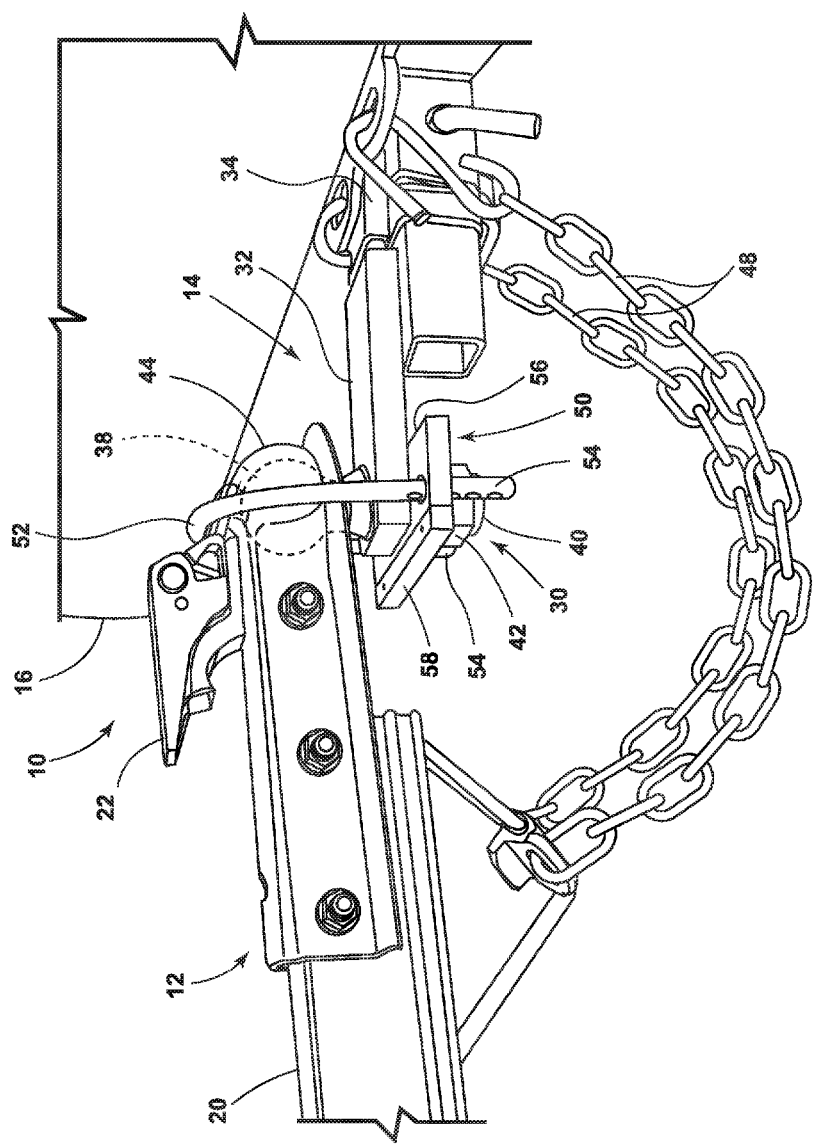
FIG. 1 is a perspective view of a trailer coupler assembly coupled to a towing hitch and a trailer hitch safety assembly according to an embodiment of the invention.

A trailer hitch safety assembly in accordance with an embodiment of the invention is illustrated in the drawings and designated 10. With reference to FIG. 1, a towing trailer (not shown) includes a trailer coupler 12 that is releasably coupled to a towing hitch 14 mounted to a towing vehicle 16 in a conventional manner for towing the trailer. The trailer hitch safety assembly 10 can be used with the towing hitch 14 to inhibit uncoupling of the trailer from the towing vehicle 16 in the event that the coupler assembly 12 uncouples from the towing hitch 14. In this manner, the trailer hitch safety assembly 10 may act as a towing safety device that inhibits unintentional uncoupling of the trailer and towing vehicle 16. The trailer hitch safety assembly 10 is optionally configured to prevent uncoupling of the trailer from the towing vehicle 16 by an unauthorized person, thus providing the trailer hitch safety assembly with an anti-theft feature. As used herein, uncouple, and its verb tenses, refers to the coupler assembly 12 disconnecting from the towing hitch 14 such that the coupler assembly 12 intermittently lifts off the towing hitch 14 and/or permanently lifts off the towing hitch 14 such that the trailer is no longer being towed by the towing vehicle 16.

Still referring to FIG. 1, the coupler assembly 12 is connected to the trailer by a trailer tongue 20 and includes a locking lever 22 for engaging a latch mechanism (not shown) that secures the coupler assembly 12 onto the towing hitch 14. A conventional locking pin (not shown) can be used to prevent the locking lever 22 from being unintentionally lifted and thereby disengaging the latch mechanism. The coupler assembly 12 can be configured according to any conventional coupler assembly associated with a towing trailer. Non-limiting examples of towing trailers that utilize the coupler assembly 12 include boat trailers, recreational vehicle trailers (e.g. snow mobile trailer), campers, travel trailers, flat bed trailers, and tool crib trailers.

The towing hitch 14 may be configured as a conventional towing hitch and includes a hitch ball 30 supported on a ball mount 32. The ball mount 32 is configured to slide into a receiver 34 mounted on the towing vehicle 16. The receiver 34 is mounted to the frame (not shown) of the towing vehicle 16 for supporting the trailer during towing. In another embodiment, the ball mount 32 may be permanently mounted to the towing vehicle 16. The trailer hitch safety assembly 10 described herein may also be used with alternative towing hitch designs without deviating from the scope of the invention.

The hitch ball 30 includes a ball portion 38, a shank portion 40, and a nut 42. The shank portion 40 is configured to be inserted through an aperture in the ball mount 32 and the nut 42 is threaded onto a threaded portion of the shank portion 40 to secure the hitch ball 30 onto the ball mount 32 in a conventional manner. The ball portion 38 is configured to be received within a ball socket 44 of the coupler assembly 12. One or more safety chains 48 are optionally coupled to the trailer tongue 20 and the receiver 34 to prevent the trailer from separating from the towing vehicle 16 the event that the coupler assembly 12 unintentionally uncouples from the towing hitch 14.

Still referring to FIG. 1, the trailer hitch safety assembly 10 includes a base 50 and a locking arm 52. The base 50 is received on the shank portion 40 on an underside of the ball mount 32 and secured between the ball mount 32 and the nut 42. The locking arm 52 is releasably connected to the base 50 at distal ends 54 and has a central arm portion that is configured to extend over the coupler assembly 12 when the ball portion 38 is received within the ball socket 44. When the base 50 is secured between the nut 42 and the ball mount 32 and the locking arm 52 is connected to the base 50, the locking arm 52 inhibits uncoupling of the coupler assembly 12 and the towing hitch 14, even in the event that the locking lever 22 is disengaged or damaged. While the locking arm 52 is illustrated as having an arched, inverted U-shaped cross-sectional shape, the locking arm 52 can have any geometric cross-sectional shape, including a flat bottom U-shape, for example.

Figure 2:
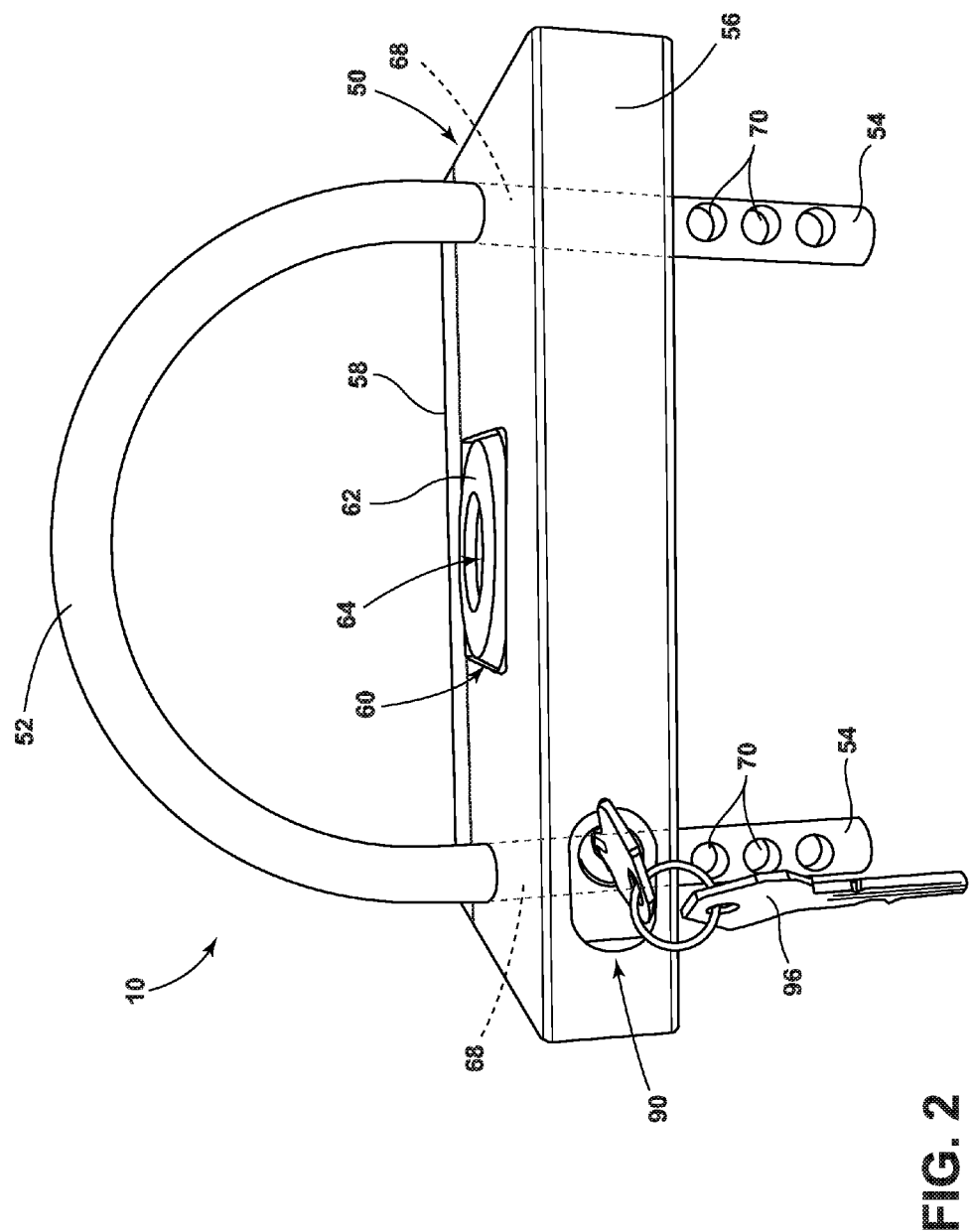
FIG. 2 is a perspective view of a trailer hitch safety assembly according to an embodiment of the invention.
Figure 3:
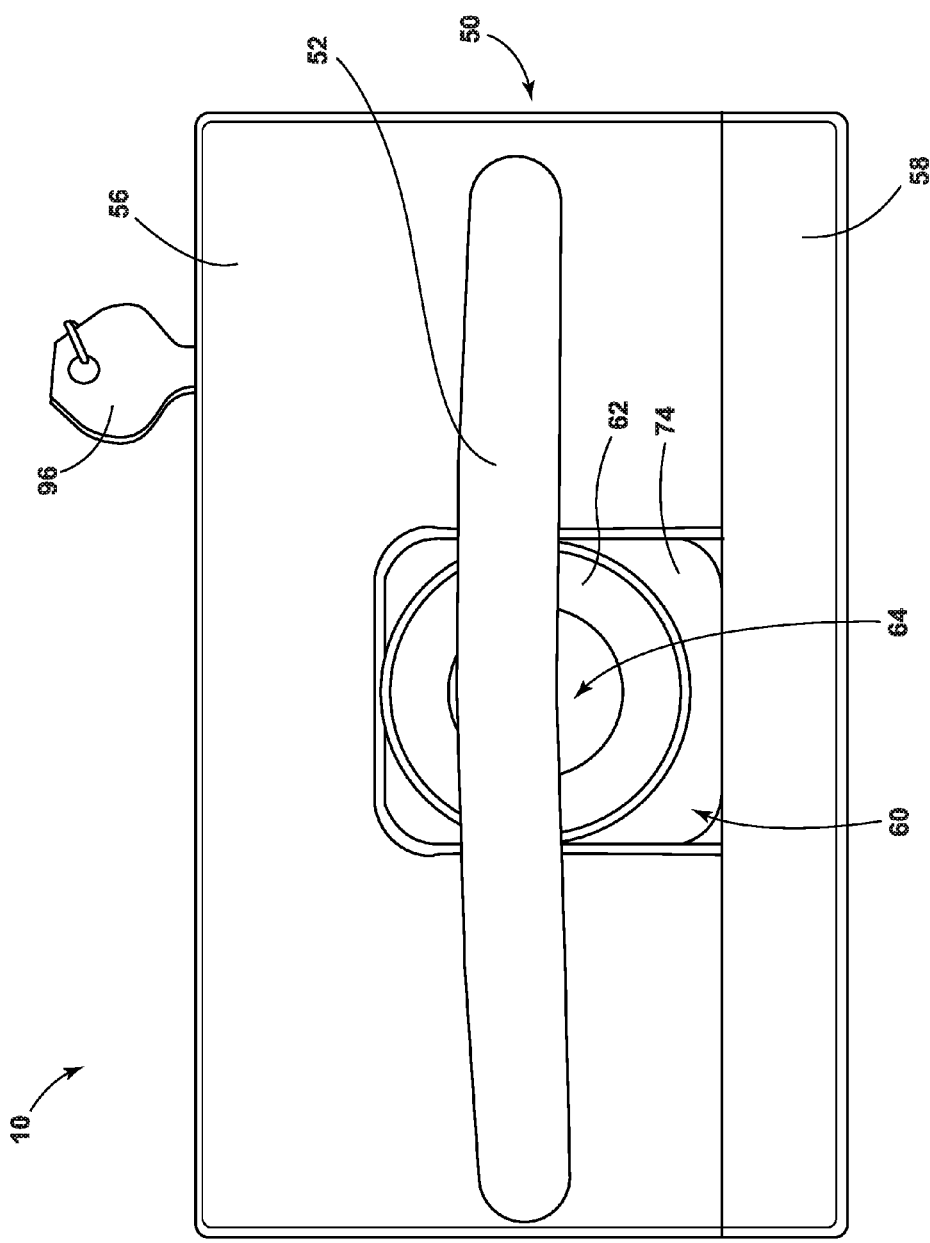
FIG. 3 is a top-down view of the trailer hitch safety assembly of FIG. 2.

With reference to FIGS. 2-3, the base 50 of the trailer hitch safety assembly 10 includes a first base portion 56 and a second base portion 58 which together define a ring receiver 60 adapted to retain a mounting ring 62 therein. The mounting ring 62 includes a bore 64 adapted to receive the shank portion 40 of the hitch ball 30 to mount the trailer hitch safety assembly 10 onto the towing hitch 14. Each end 54 of the locking arm 52 extends through one of a pair of locking arm channels 68 provided in the first portion 56 of the base 50. Each end 54 of the locking arm 52 can include one or more apertures 70 for connecting the ends 54 with the first base portion 56. In one example, the locking arm 52 includes multiple apertures 70 for adjusting a height of the locking arm 52 above the base 50.

The first base portion 56 and the second base portion 58 can have any desired geometries, which may be the same or different. For example, as illustrated in FIG. 3, both the first and second base portions 56, 58 have a generally rectangular shape with the first base portion 56 forming a larger portion of the base 50 than the second base portion 58. Optionally, the corners of the first and second base portion 56, 58 can be rounded according to any suitable radius of curvature. In other embodiments, the first and/or second base portions 56, 58 can have a rounded or multi-faceted shape such that the first and second base portions 56, 58 together define a circular or oval base 50 or a multi-faced figure, such as a hexagon.

Figure 4:
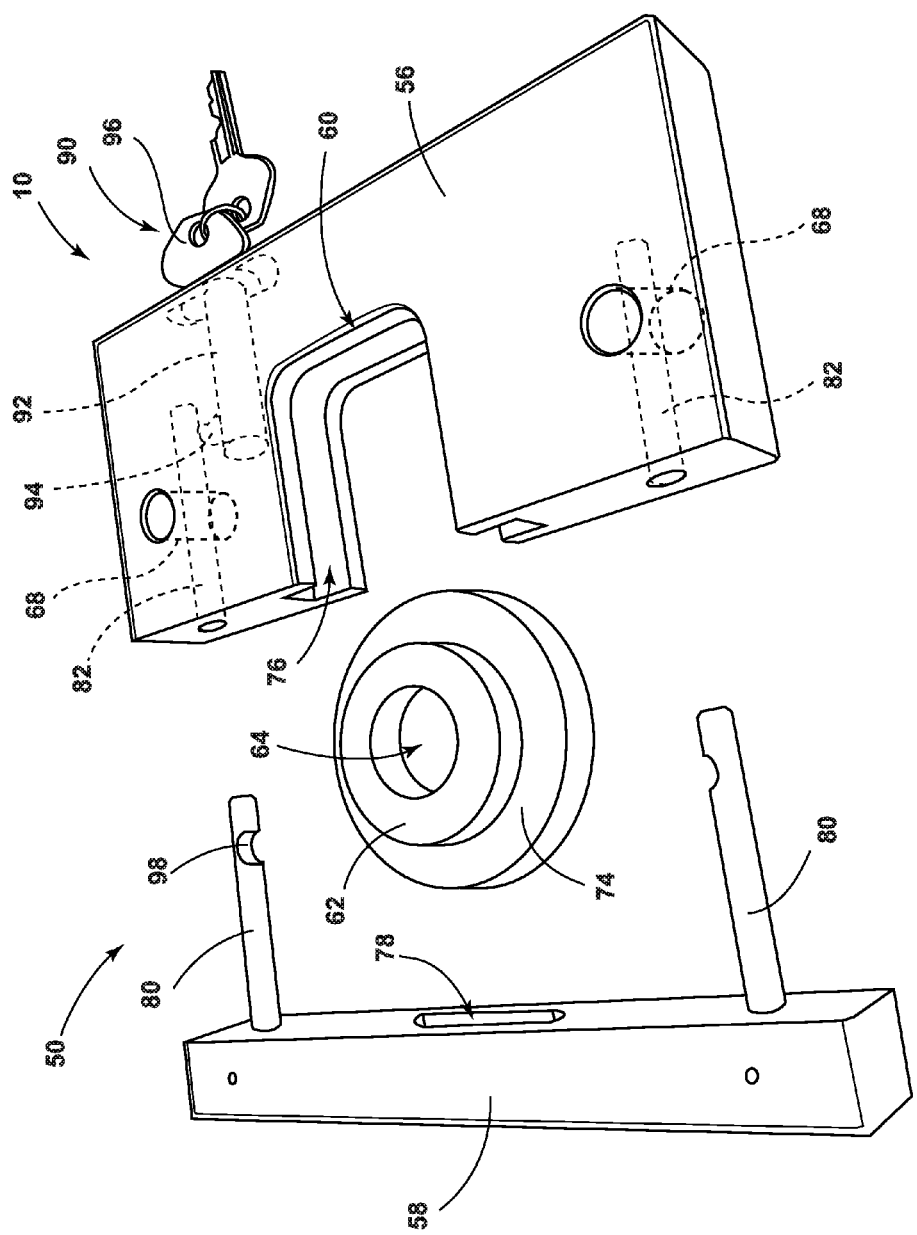
FIG. 4 is a partially exploded view of the trailer hitch safety assembly of FIG. 2.

Referring now to FIG. 4, the ring receiver 60 includes a first receiver channel 76 formed in the first base portion 56 and a second receiver channel 78 in the second base portion 58. The mounting ring 62 includes a collar 74 that is adapted to be received within the first and second receiver channels 76, 78. The first and second receiver channels 76, 78 allow the first and second base portion 56, 58 to fit flush together around the mounting ring 62. The first and second receiver channels 76, 78 can also be configured to allow the collar 74 to rotate therein, thus allowing the mounting ring 62 to be rotatably secured within the base 50.

Still referring to FIG. 4, the second base portion 58 includes a pair of lugs 80 for coupling the first and second base portions 56, 58 together. The lugs 80 are received within a pair of aligned base channels 82 formed in the first base portion 56 that intersect with the pair of locking arm channels 68. The lugs 80 have sufficient length to extend through the aligned base channels 82 in the first base portion 56 and through the intersection of the locking arm channels 68. In this manner, when the ends of the locking arm 52 are inserted into the locking arm channels 68 and one of the height adjusting apertures 70 is aligned with the base channel 82, the lugs 80 may pass through the aligned apertures 70, thus securing the locking arm 52 to the base 50.

The base 50 optionally includes a lock assembly 90 for releasably securing the lugs 80 within the first base portion 56. The lock assembly 90 can include any suitable mechanism that selectively engages one or both of the lugs 80 to prevent the lugs 80 from being withdrawn from within the first base portion 56. Preventing the lugs 80 from being withdrawn prevents the locking arm 52 from being withdrawn from the first base portion 56 and also prevents the second base portion 58 from being separated from the first base portion 56.

In the embodiment illustrated in FIG. 4, the lock assembly 90 is in the form of a cylinder pin-tumbler lock 92, such as is used in a conventional padlock. The cylinder pin-tumbler lock 92 includes a latch 94 that is actuated by a key 96 in the same manner as a conventional cylinder pin-tumbler lock in a padlock. One of the lugs 80 includes a notch 98 that is engaged by the key-actuated latch 94 to prevent the lug 80 from being withdrawn from the first base portion 56. In another example, the lock assembly 90 can be in the form of a threaded bolt or resilient pin that selectively engages one or both of the lugs 80. The lock assembly 90 can be configured to engage a single lug 80, as illustrated, or both lugs 80.

II. Operation

An exemplary method of using the trailer hitch safety assembly 10 with the trailer coupler 12 and towing hitch 14 is now described. Prior to fully assembling the trailer hitch safety assembly 10, the trailer coupler 12 is coupled to the towing hitch 14 in a conventional manner. The trailer coupler 12 and the towing hitch 14 are aligned such that the ball portion 38 of the hitch ball 36 is received within the ball socket 44 of the coupler assembly 12. The locking lever 22 can optionally be engaged prior to or subsequent to assembly of the trailer hitch safety assembly 10.

Prior to or subsequent to coupling of the trailer coupler 12 and the towing hitch 14, the mounting ring 62 is slid onto the shank portion 40 of the hitch ball 36. Prior to installing the mounting ring 62, the nut 42 is removed from the shank portion 40. The mounting ring 62 is slid onto the shank portion 40 until the mounting ring 62 is adjacent to an underside of the ball mount 32. The exact location of the mounting ring 62 can vary, however the mounting ring 62 should be positioned on the shank portion 40 such that the locking arm 52 can be secured to the base 50 in subsequent steps.

Optionally, the nut 42 is coupled to the shank portion 40 to secure the mounting ring 62 in the desired location on the shank portion 40. The nut 42 may be coupled to the shank portion 40 prior to or subsequent to assembling the base 50 on the mounting ring 62. The nut 42 facilitates assembling the trailer hitch safety assembly 10 by holding the mounting ring 62 in place, making it easier to assemble the base 50. However, the base 50 can be assembled around the mounting ring 62 without the nut 42. The trailer hitch safety assembly 10 may optionally be used without the nut 42, however, as an additional precaution, it is recommended that the nut 42 be threaded onto the shank portion 40 when the trailer coupler 12 is coupled to the towing hitch 14.

Figure 5:
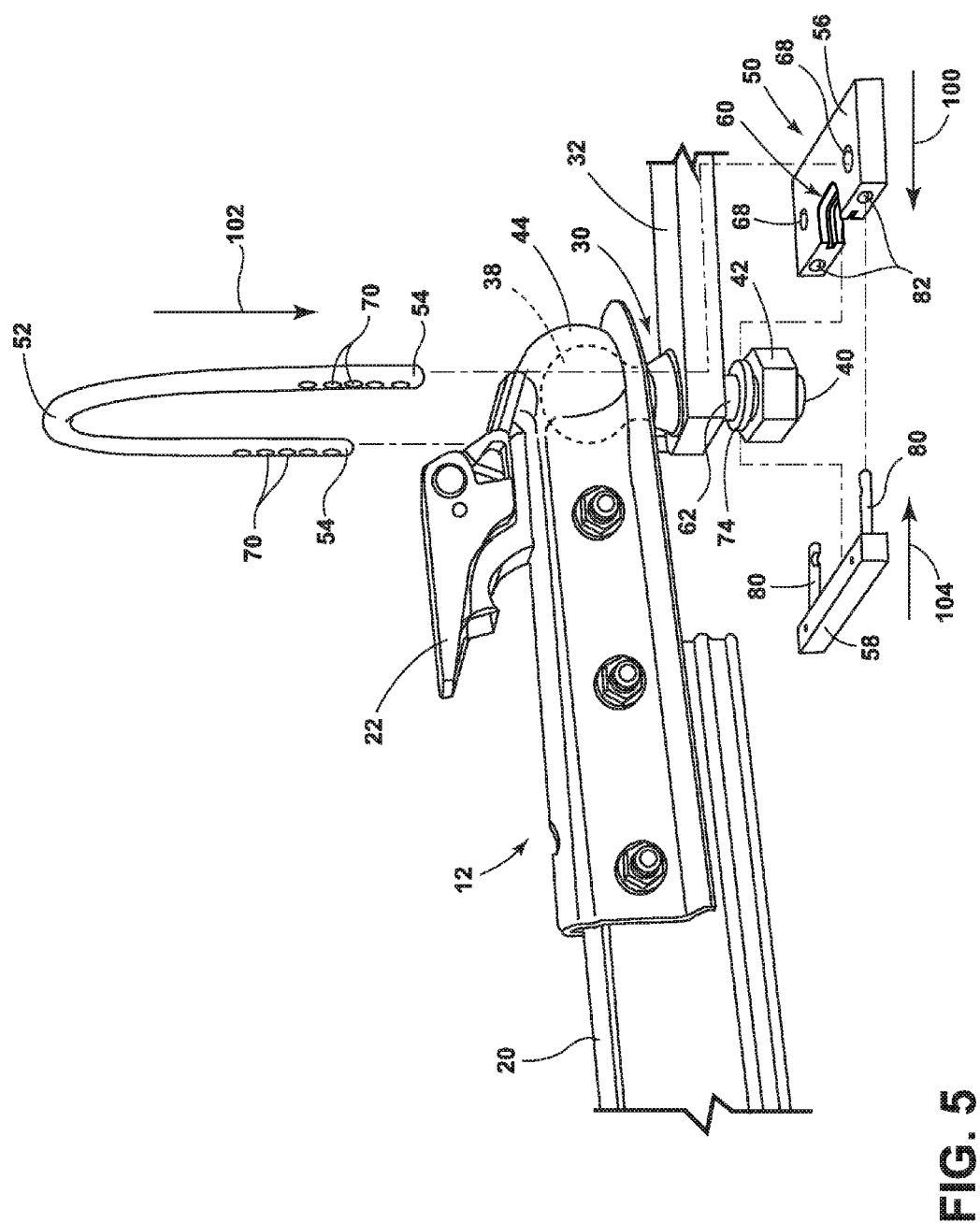
FIG. 5 illustrates a process for installing a trailer hitch safety assembly on a coupled trailer coupler assembly and towing hitch according to an embodiment of the invention.

Subsequent to the installation of the mounting ring 62, the first base portion 56 is installed around the mounting ring 62, as illustrated by arrow 100. The ring receiver 60 is aligned with the mounting ring 62 on the shank portion 40 and the first base portion 56 is slid onto the mounting ring 62 with the collar 74 seated within the first receiver channel 76. As illustrated in FIG. 5, the first base portion 56 surrounds at least half of the circumference of the mounting ring 62, which facilitates stabilizing the first base portion 56 on the mounting ring 62 until the trailer hitch safety assembly 10 is fully assembled. Alternatively, the first base portion 56 may surround less than half of the circumference of the mounting ring 62, with the first and second base portions 56, 58 having approximately the same dimensions.

Still referring to FIG. 5, the locking arm 52 is aligned above the coupled trailer coupler 12 and towing hitch 14. The locking arm 52 is then moved downward, as illustrated by arrow 102, and the locking arm ends 54 are inserted into the pair of locking arm channels 68 in the first base portion 56. The locking arm ends 54 are inserted into the locking arm channels 68 until the desired aperture 70 in each end 54 is aligned with each base channel 82. When the locking arm 52 is provided with multiple apertures 70 on each end 54, the user can align the desired aperture 70 with the base channels 82 based on a height of the coupled trailer coupler 12 and towing hitch 14 and the desired tightness of the fit of the locking arm 52 around the trailer coupler 12.

Subsequent to inserting the locking arm ends 54 into the first base portion 50, the lugs 80 extending from the second base portion 58 are aligned with the base channels 82 and the second base portion 58 is moved toward the first base portion 56, as illustrated by arrow 104. The lugs 80 are inserted into the base channels 82 and through the aligned locking arm apertures 70 at the intersection of the base channel 82 and the locking arm channel 68 to connect the first and second base portions 56 and 58.

Referring again to FIG. 1, the trailer hitch safety assembly 10 is shown in a fully assembled condition with the locking arm 52 extending over the trailer coupler 12. In this condition, the connection between the locking arm 52, which extends over the trailer coupler 12 above the ball mount 32, and the base 50 below the ball mount 32 inhibits uncoupling of the trailer coupler 12 from the towing hitch 14. In the event that the trailer coupler assembly lock is damaged or disengaged, the trailer coupler 12 is inhibited from lifting off the towing hitch 14 by virtue of the trailer coupler 12 being confined between the locking arm 52 above the ball mount 32 and the base 50 below the ball mount 32.

Following the connection of the first and second base portions 56, 58 and the locking arm 52, the optional lock assembly 90 (FIG. 4) can be engaged to prevent the lugs 80 from being withdrawn from the base channels 82, thereby preventing separation of the first and second base portions 56, 58 and also preventing withdrawal of the locking arm 52 from the first base portion 56. Key 96 can be turned to actuate the latch 94 to engage the notch 98 in the adjacent lug 80 to prevent the lug 80 from being withdrawn from the first base portion 56. The lock assembly 90 provides an additional safety feature to the assembled trailer hitch safety assembly 10 by inhibiting unintended separation of the first and second base portions 56, 58 and the locking arm 52. In addition, the lock assembly 90 provides a security feature that prevents unauthorized users from disconnecting the trailer hitch safety assembly 10 and uncoupling the trailer coupler 12.

The trailer hitch safety assembly 10 can be used with or without the conventional safety chains 48. Because the trailer hitch safety assembly 10 inhibits uncoupling of the trailer coupler 12 and the towing hitch 14, the safety chains 48 are not necessary as a towing safety device. However, the safety chains 48 may be used with the trailer hitch safety assembly 10, if desired.

To disconnect the trailer hitch safety assembly 10, the lock assembly 90 is actuated to disengage the lug 80, allowing the lugs 80 to be withdrawn from the base channels 82 as the second base portion 58 is separated from the first base portion 56. Once the lugs 80 have been withdrawn from the apertures 70, the locking arm ends 54 can be withdrawn from the locking arm channels 68 to separate the locking arm 52 from the first base portion 56. The first base portion 56 can then be withdrawn from the mounting ring 62, the nut 42 is removed from the shaft portion 40 (if present), and the mounting ring 62 is removed from the shaft portion 40. The thus disconnected components of the trailer hitch safety assembly 10 can optionally be reassembled for storage in a manner similar to that described above for FIG. 5.

Figure 6:
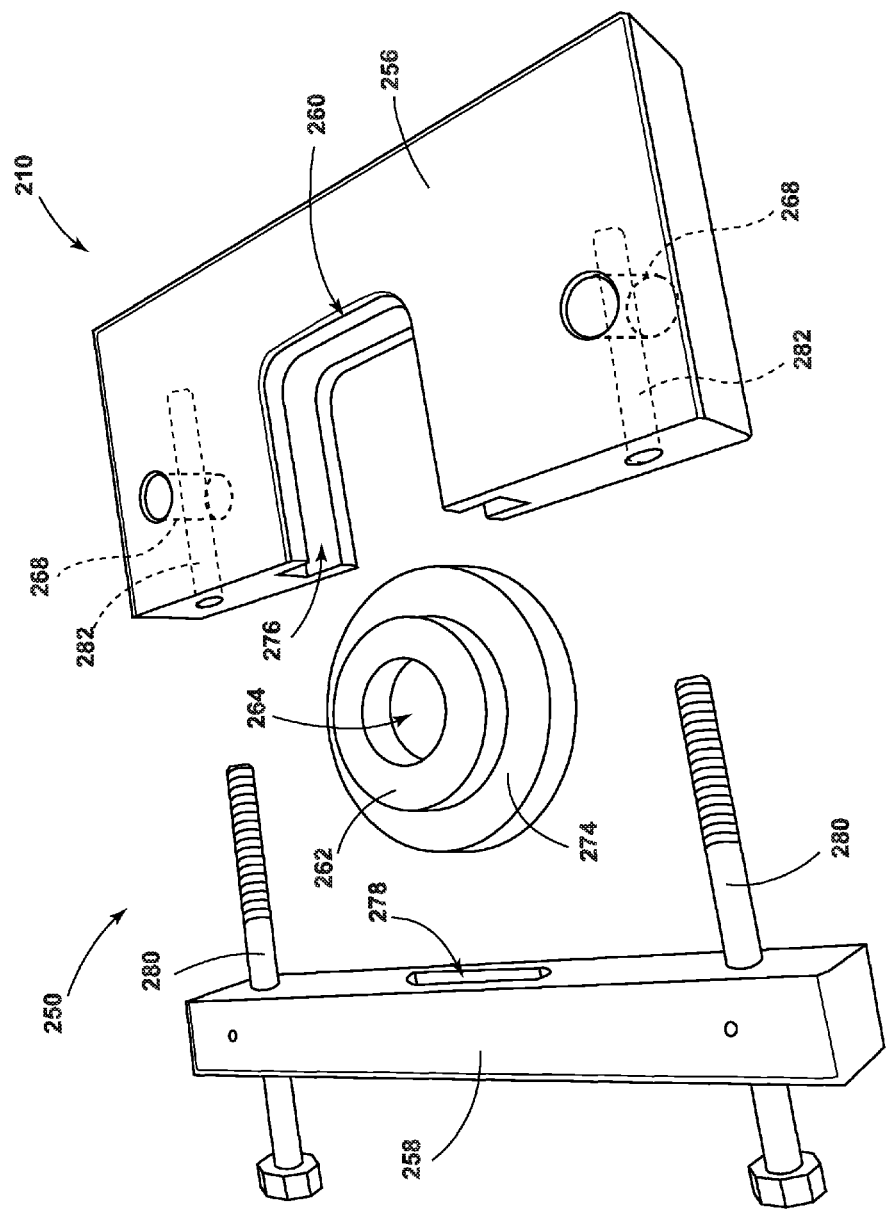
FIG. 6 is a partially exploded view of a trailer hitch safety assembled according to an embodiment of the invention.

Referring now to FIG. 6, a trailer hitch safety assembly 210 that is similar to the trailer hitch safety assembly 10 of FIGS. 1-5 except for the configuration of the base 250 is illustrated. The base 250 is usable with the locking arm 52 of the trailer hitch safety assembly 10 to inhibit uncoupling of the trailer coupler 12 and towing hitch 14 in a manner similar to that described above with respect to FIG. 5. Therefore, elements of the trailer hitch safety assembly 210 similar to those of the trailer hitch safety assembly 10 are labeled with the prefix 200.

Still referring to FIG. 6, the second base portion 258 includes a pair of lugs in the form of bolts 280 for connecting the first and second base portions 256, 258. The bolts 280 are configured to extend through and project from the second base portion 258 for receipt within an aligned pair of base channels 282 in the first base portion 256. At least a portion of the base channels 282 includes threads configured to mate with corresponding threads on the bolts 280 to secure the first and second base portions 256, 258 together. The base channels 282 intersect with a pair of locking arm channels 268 in a manner similar to that described above for the base channels 82 and locking arm channels 68 of the trailer hitch safety assembly 10 of FIG. 4. The bolts 280 have sufficient length such that the bolts 280 pass through the intersection between the base channels 282 and the locking arm chancels 268 to secure the locking arm 52 (FIG. 5) to the first base portion 256 in a manner similar to that described above for the trailer hitch safety assembly 10 of FIGS. 5-6.

The trailer hitch safety assembly 210 can be assembled in a manner similar to that described above for the trailer hitch safety assembly 10 of FIG. 5. The mounting ring 262 and first base portion 256 are mounted onto the shaft portion 40 of the towing hitch 14 and the locking arm is connected with the first base portion 256 in the same manner as described above with respect to FIG. 5. The first and second base portions 256 and 258 are then connected together by inserting the bolts 280 into the base channels 282 and through the intersection between the base channels 282 and the locking arm channels 268. The bolts 280 pass through the apertures in the locking arm 52 (FIG. 5) aligned with the intersection between the base and locking arm channels 282 and 286 to secure the locking arm 52 with the first base portion 256 in the same manner as described above with respect to FIG. 5.

The bolts 280 may be inserted into the base channels 282 until the threaded portion of the bolts 280 engages the threaded portion of the base channels 282 and then the bolts 280 are rotated to advance the bolt 280 through the base channels 282. The bolts 280 may be rotated by hand and/or with the use of an appropriate tool. The bolts 280 and the base channels 282 can be configured such that the bolts 280 can be slid part way through the base channels 282 prior to engagement of the threads on the bolts 280 and base channels 282, which then requires rotation of the bolts 280 to advance the bolts 280 through the base channels 282. Allowing the bolts 280 to be slid into the base channels 282 at least part way before engagement of the threads facilitates the ease with which the first and second portions 256, 258 are connected while also providing the additional security offered by a threaded connection between the bolts 280 and the first base portion 256. Optionally, the entire length of the base channels 282 can be threaded.

Threading the bolts 280 onto the threaded portion of the base channels 282 decreases the likelihood that the first and second base portions 256, 258 become inadvertently disconnected. The trailer hitch safety assembly 210 optionally includes the lock assembly 90 to further decrease the likelihood that the first and second base portions 256, 258 become inadvertently disconnected. One of the bolts 280 can include a notch that is engaged by the lock assembly latch 94 in a manner similar to that described above for the trailer hitch safety assembly 10 of FIGS. 4 and 5. The lock assembly 90 provides an additional safety feature to the assembled trailer hitch safety assembly 210 by inhibiting unintended separation of the first and second base portions 256, 258 and the locking arm 52. In addition, the lock assembly 90 provides a security feature that prevents unauthorized users from disconnecting the trailer hitch safety assembly 210 and uncoupling the trailer coupler 12.

Figure 7:
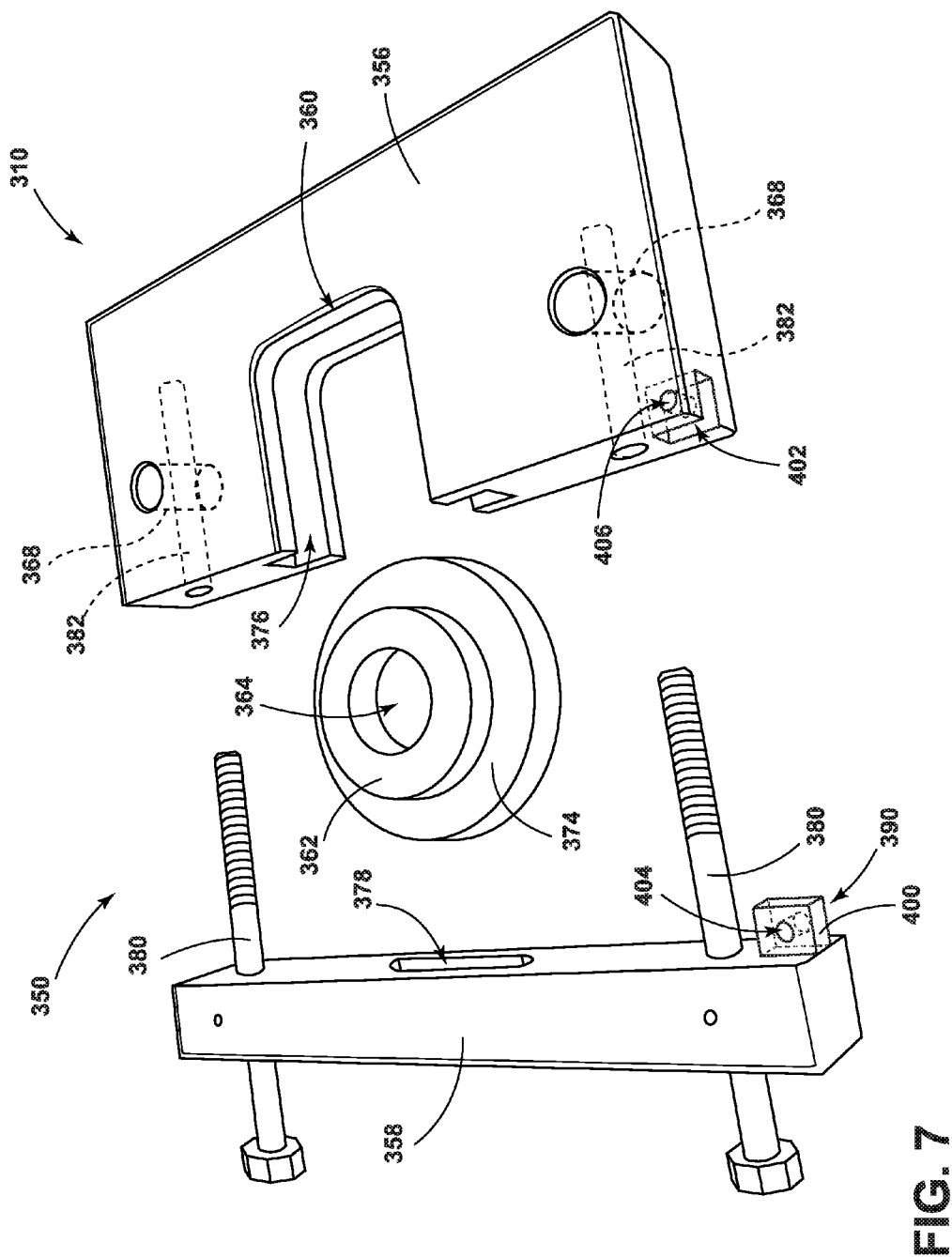
FIG. 7 is a partially exploded view of a trailer hitch safety assembled according to an embodiment of the invention.

Referring now to FIG. 7, a trailer hitch safety assembly 310 that is similar to the trailer hitch safety assembly 210 of FIG. 6 is illustrated. The trailer hitch safety assembly 310 includes a lock assembly 390 that inhibits unintended separation of the first and second base portions 356, 358. Therefore, elements of the trailer hitch safety assembly 310 similar to those of the trailer hitch safety assembly 210 are labeled with the prefix 300.

The lock assembly 390 can include a male portion 400 projecting from the second base portion 358 that is configured to be received within a cavity 402 incorporated into the first base portion 356. The male portion 400 can include a first channel 404 that aligns with a second channel 406 formed in the first base portion 356 when the male portion 400 is inserted into the cavity 402. A latch pin or lock arm (e.g. from a padlock) can be inserted through the aligned first and second channels 404, 406 when the male portion 400 is received within the cavity 402 to inhibit separation of the first and second base portions 356, 358. Alternatively, the male portion 400 can project from the first base portion 356 and be received within a corresponding cavity 402 formed in the second base portion 358.

III. Conclusion

The embodiments described herein provide for a trailer hitch safety assembly that is easy to install and remove. The trailer hitch safety assembly is compact, making it easy to store when not in use and minimizing its footprint during use. Compared to conventional safety chains, the trailer hitch safety assembly described herein does not have trailing parts that may become entangled with other parts of the towing vehicle, trailer, and/or the surroundings. In addition, the interconnectedness of the components—the first and second base portions and the locking arm—prevent the components of the trailer hitch safety assembly from inadvertently disconnecting from one another during use. The locking arm and base of the trailer hitch safety assembly confine the trailer coupler and towing hitch between the locking arm and the ball mount, thus inhibiting uncoupling of the trailer coupler even in scenarios in which the towing hitch nut is lost or not used, the coupler latching mechanism is not properly engaged, the coupler latch pin is not used, and/or when the trailer coupler and towing hitch are improperly paired. In addition, the trailer hitch safety assembly can incorporate a lock assembly that inhibits unauthorized uncoupling of the trailer coupler from the towing hitch, thus preventing theft of the trailer.

The above description is that of a current embodiment of the invention. Various alterations and changes can be made without departing from the spirit and broader aspects of the invention as defined in the appended claims, which are to be interpreted in accordance with the principles of patent law including the doctrine of equivalents.

This disclosure is presented for illustrative purposes and should not be interpreted as an exhaustive description of all embodiments of the invention or to limit the scope of the claims to the specific elements illustrated or described in connection with these embodiments. For example, and without limitation, any individual element of the described invention may be replaced by one or more alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative.

The invention is not limited to the details of operation or to the details of construction and the arrangement of the components set forth in the above description or illustrated in the drawings. The invention may be implemented in various other embodiments and practiced or carried out in alternative ways not expressly disclosed herein. Also, the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

The disclosed embodiment includes a plurality of features that are described in concert and that might cooperatively provide a collection of benefits. The present invention is not limited to only those embodiments that include all of these features or that provide all of the stated benefits.

Any reference to claim elements in the singular, for example, using the articles "a," "an," "the" or "said," is not to be construed as limiting the element to the singular.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation.

The embodiments of the invention in which an exclusive property or privilege is claimed are defined as follows:

1. A trailer hitch safety assembly for inhibiting uncoupling of a trailer coupler from a towing hitch, the towing hitch comprising a hitch ball having a ball portion and a shank portion and the trailer coupler having a ball socket configured to receive the ball portion when the trailer coupler is coupled to the towing hitch, the trailer hitch safety assembly comprising:
   a mounting ring defining a bore adapted to receive the shank portion;
   a base having a first base portion and a second base portion, at least one of the first and second base portions defining a ring receiver adapted to receive the mounting ring, the first and second base portions releasably connecting together around the mounting ring to retain the mounting ring within the ring receiver, the first base portion including a first pair of channels and the second base portion including a pair of lugs, the pair of lugs being received within the first pair of channels to connect the first and second base portions; and a locking arm having a first end portion and a second end portion connected by a central portion, the first and second end portions releasably connecting to the base, wherein the central portion extends over the coupled trailer coupler and towing hitch when the first and second end portions are connected to the base to inhibit uncoupling of the trailer coupler from the towing hitch.

2. The trailer hitch safety assembly of claim 1 wherein:

the first base portion includes a second pair of channels, intersecting the first pair of channels; and the first and second end portions of the locking arm include at least one aperture, the first and second end portions adapted to be received within the second pair of channels with the at least one aperture aligned with the first pair of channels, wherein when the second base portion is connected to the first base portion, the pair of lugs passes through the first pair of channels and the at least one aperture in the first and second end portions to retain the locking arm with the first base portion.

3. The trailer hitch safety assembly of claim 2 wherein the first and second end portions each include multiple apertures through which the pair of lugs are configured to pass to adjust a height of the central arm portion above the first base portion.

4. The trailer hitch safety assembly of claim 1 further comprising a lock assembly that selectively engages one or both of the pair of lugs within the first pair of channels to prevent separation of the second base portion from the first base portion.

5. The trailer hitch safety assembly of claim 4 wherein the lock assembly comprises a key-actuated cylinder pin-tumbler lock.

6. The trailer hitch safety assembly of claim 1 wherein:

the pair of lugs comprises a threaded portion; and the first pair of channels comprises a threaded portion, wherein the threaded portion of the pair of lugs mates with the threaded portion of the first pair of channels to releasably connect the first and second base portions.

7. The trailer hitch safety assembly of claim 1 wherein the mounting ring is rotatable within the ring receiver.

8. The trailer hitch safety assembly of claim 1 wherein the ring receiver is primarily defined by the first base portion.

9. A method for inhibiting uncoupling of a trailer coupler from a towing hitch, the towing hitch comprising a hitch ball having a ball portion and a shank portion and the trailer coupler having a ball socket receiving the ball portion when the trailer coupler is coupled to the towing hitch, the method comprising:

installing a mounting ring on the shank portion, the mounting ring having a bore adapted to receive the shank portion;

installing a first base portion around the mounting ring, the first base portion defining at least a portion of a ring receiver adapted to receive the mounting ring;

installing a locking arm over the coupled trailer coupler and towing hitch, the locking arm comprising a central portion extending over the trailer coupler and first and second end portions adapted to releasably connect to the first base portion;

inserting the first and second end portions into a first pair of channels formed in the first base portion;

connecting a second base portion to the first base portion around the mounting ring, the first and second base portions forming a base encompassing the mounting ring, the connecting a second base portion to the first base portion including inserting a pair of lugs projecting from the second base portion into a second pair of channels formed in the first base portion; and securing the first and second end portions within the first base portion, wherein the locking arm extends over the trailer coupler and inhibits the trailer coupler from uncoupling from the towing hitch when the first and second end portions are connected to the base.

10. The method of claim 9 wherein:

the first and second end portions comprise at least one aperture; and the securing the first and second end portions comprises inserting the first and second end portions into the first pair of channels with the at least one aperture in the first and second end portions aligned with the second pair of channels, wherein the pair of lugs project through the second pair of channels and through the at least one aperture to secure the first and second end portions within the first base portion.

11. The method of claim 10 wherein the first and second end portions comprise multiple apertures, and wherein the method further comprises adjusting a height of the locking arm above the base by aligning one of the multiple apertures with the second pair of channels and inserting the pair of lugs therethrough.

12. The method of claim 9 wherein the connecting a second base portion to the first base portion comprises mating a threaded portion of the pair of lugs with a threaded portion of the second pair of channels.

13. The method of claim 9 further comprising actuating a lock assembly provided with the first base portion that selectively engages one or both of the pair of lugs within the second pair of channels to prevent separation of the second base portion from the first base portion.

14. The method of claim 13 wherein the actuating a lock assembly step comprises actuating a key-actuated cylinder pin-tumbler lock.

15. The method of claim 9 wherein the installing a mounting ring step comprises installing a mounting ring that is rotatable within the ring receiver.

16. The method of claim 9 further comprising threading a nut onto the shank portion to secure the mounting ring between the ball portion and the nut.

* * * * *